United States Patent [19]

Reilly et al.

[11] Patent Number: 5,440,689

[45] Date of Patent: Aug. 8, 1995

[54] INTERPROCESSOR COMMUNICATION SYSTEM FOR DIRECT PROCESSOR TO PROCESSOR COMMUNICATION BETWEEN INTERNAL GENERAL PURPOSE REGISTERS TRANSPARENT TO THE EXECUTION OF PROCESSORS THEREOF

[75] Inventors: John J. Reilly, Huntington; Sebastian T. Ventrone, Jericho, both of Vt.

[73] Assignee: International Business Machines Corporation, Armonk, N.Y.

[21] Appl. No.: 161,858

[22] Filed: Dec. 3, 1993

Related U.S. Application Data

[63] Continuation of Ser. No. 806,576, Dec. 12, 1991, abandoned.

[51] Int. Cl.6 ............................................. G06F 15/16
[52] U.S. Cl. ............................... 395/200.08; 395/800;
395/700; 364/228.3; 364/229; 364/229.1;
364/DIG. 1
[58] Field of Search ............... 395/200, 275, 375, 425,
395/800; 364/131, 228, 228.1, 229, 238, 247,
933.3, 134

[56] References Cited

U.S. PATENT DOCUMENTS

| | | | |
|---|---|---|---|
| 4,355,355 | 10/1982 | Butwell et al. | 364/200 |
| 4,622,632 | 11/1986 | Tanimoto et al. | 395/800 |
| 4,628,481 | 12/1986 | Reddaway | 364/900 |
| 4,636,942 | 1/1987 | Chen et al. | 364/200 |
| 4,661,900 | 4/1987 | Chen et al. | 364/200 |
| 4,684,941 | 8/1987 | Smith et al. | 340/825.52 |
| 4,754,398 | 6/1988 | Pribnow | 364/200 |
| 4,843,540 | 6/1989 | Stolfo | 364/200 |
| 4,853,849 | 8/1989 | Bain, Jr. et al. | 364/200 |
| 4,884,190 | 11/1989 | Ngai et al. | 364/200 |
| 4,901,230 | 2/1990 | Chen et al. | 364/200 |
| 4,907,070 | 6/1990 | Wesolowski | 358/17 |
| 5,123,094 | 6/1992 | MacDougall | 395/375 |
| 5,201,039 | 4/1993 | Sakamura | 395/375 |
| 5,287,503 | 2/1994 | Narad | 395/425 |

FOREIGN PATENT DOCUMENTS

| | | |
|---|---|---|
| 0175873A3 | of 1986 | European Pat. Off. . |
| 0240146 | 1/1982 | Japan . |
| 1261707 | of 1989 | Japan . |
| 0118941 | 7/1990 | Japan . |

OTHER PUBLICATIONS

ITOM International Co., "Serlin Report on Parallel Processing," Issue #7 (Dec., 1987).

*Primary Examiner*—Thomas C. Lee
*Assistant Examiner*—Sang Hui Kim
*Attorney, Agent, or Firm*—Heslin & Rothenberg

[57] ABSTRACT

A system for direct interprocessor communication in a multiprocessor data processing environment. The system utilizes conventional direct data transfer means and existing I/O port instruction capabilities available on most microprocessors. A destination processor requiring data from one of a source processor's internal registers generates a unique address which specifies the register containing the required data. The address is sent to the data transfer means, causing the direct transfer of data from the designated source processor internal register to the destination processor. Specific circuitry to accomplish this direct data transfer function is described.

25 Claims, 1 Drawing Sheet

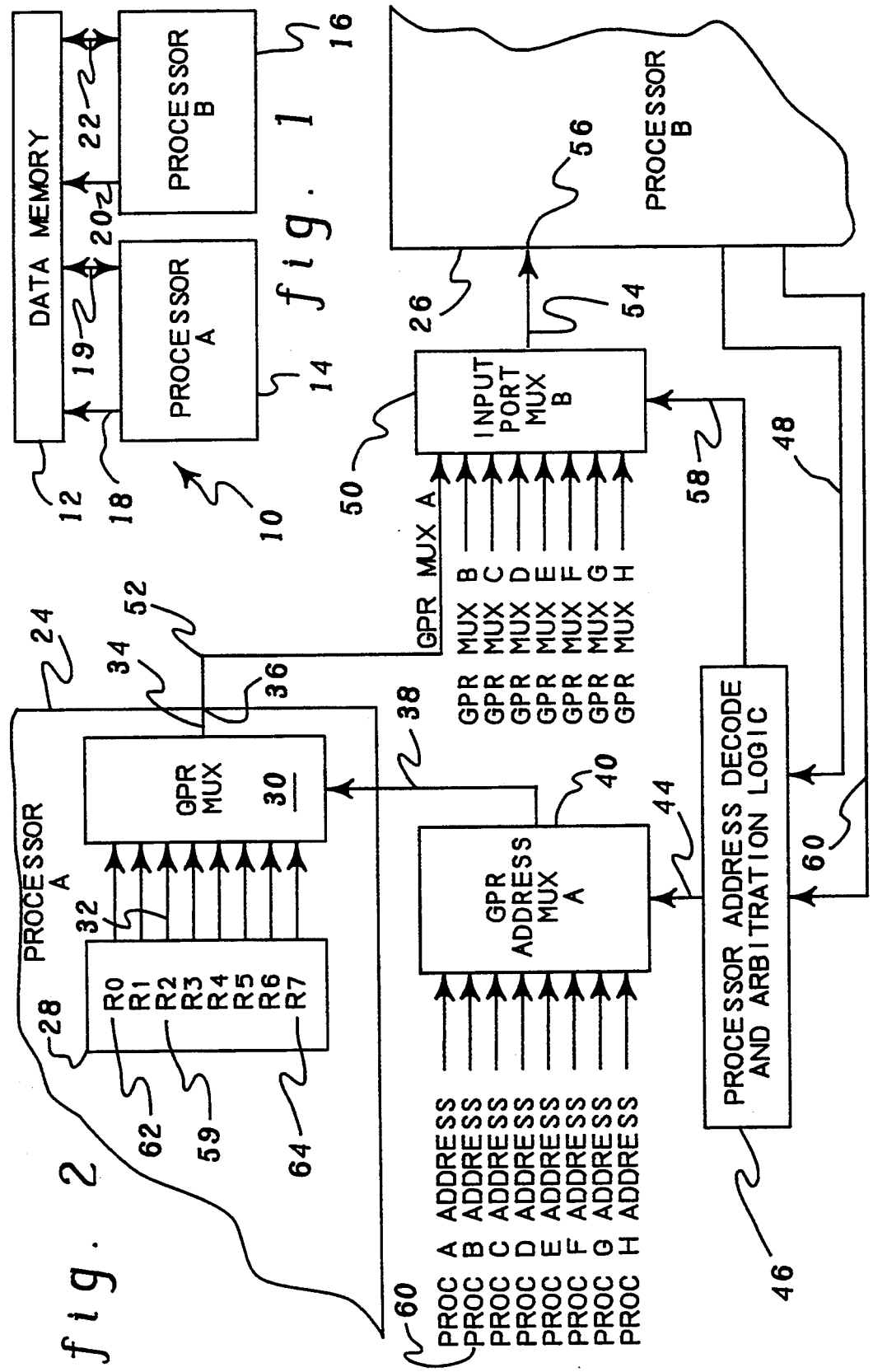

INTERPROCESSOR COMMUNICATION SYSTEM FOR DIRECT PROCESSOR TO PROCESSOR COMMUNICATION BETWEEN INTERNAL GENERAL PURPOSE REGISTERS TRANSPARENT TO THE EXECUTION OF PROCESSORS THEREOF

This application is a continuation of application Serial No. 07/806,576, filed Dec. 12, 1991, now abandoned.

BACKGROUND OF THE INVENTION

1. Technical Field

The present invention relates to digital data processors, and more particularly, to interprocessor communication in multiprocessor systems.

2. Background Art

Multiprocessor systems are typically designed such that each processor works independent of the other processors in the system and performs a single task within a given application. When one processor finishes its task on given data, the data is typically passed to another processor to start a next task. In addition, the present state of a given register within one processor may need to be monitored by another processor(s) in order to determine whether or not to perform a next task. Thus, although each processor works as an independent entity in terms of tasks, the processors often rely on data from other processors in the system. System performance is greatly affected by the speed at which these interprocessor data transfers take place. By speeding up interprocessor communication, system performance is correspondingly enhanced.

The principle prior art method of data transfer between processors involves an external write by one processor with a corresponding read by another. In the simplest form, one processor writes to an external memory location, and another processor subsequently reads that location to obtain the data. While accomplishing the goal of interprocessor data transfer, this method hinders system performance in a number of ways. For example, for every data transfer it takes at least two cycles; one for the write and one for the read. Also, the bus or buses used for the data transfers to and from data memory may not be available when a processor seeks to write to or read from memory, thus causing a further delay in the transfer.

An example of this prior art method can be found in U.S. Pat. No. 4,754,398, entitled "System for Multiprocessor Communication Using Local and Common Semaphore and Information Registers," and issued to Richard D. Pribnow. The Pribnow patent discloses what is basically a system involving the sharing of external common registers, rather than external data memory, wherein data is written and subsequently read from. Although processors can directly access these shared registers, the data must still be placed in the registers and then removed.

DISCLOSURE OF INVENTION

The invention described herein satisfies the need to improve system performance and overcomes the noted limitations in the prior art. The present invention provides a system and corresponding method for interprocessor communication in a multiprocessor system without the use of external data memory, and without the use of external reads and writes. The specific embodiment described herein utilizes multiplexers and I/O port instruction capabilities available on most microprocessors to allow rapid direct data transfer between processors with minimal architecture changes and without adding new software instructions.

Briefly described, the present invention comprises a direct interprocessor communication system for a multiprocessor data processing system. For simplicity, two processors are assumed involved, processor A and processor B. Processor B desires to acquire data contained in one of the internal registers of processor A. These internal registers each have a unique address for data accessing by processor B.

Processor B generates an address signal identifying the register in processor A which contains the desired data. This address signal is sent to data transfer means which has access to each internal register in processor A. The data transfer means responds to the address signal by directly transferring the desired data from the identified register in processor A to processor B.

These and other objects, features and advantages of this invention will become apparent to those skilled in this art from the following detailed description of one presently preferred embodiment of the invention, taken in conjunction with the accompanying drawings.

BRIEF DESCRIPTION OF THE DRAWINGS

FIG. 1 is a general block diagram of a prior art interprocessor communication system.

FIG. 2 is a partial block diagram of one embodiment of a direct data transfer system from one processor's internal registers to another processor pursuant to the present invention.

BEST MODE FOR CARRYING OUT THE INVENTION

Overview

The invention herein described contemplates a multiprocessor system, and focuses on the direct transfer of data from an internal register of one processor to another processor. The processor requiring the data generates an address identifying the register containing the data. Data transfer means then interprets this address and directly transfers the data to the processor requiring the data, without storing the data during the transfer. The data transfer means may accommodate substantially simultaneous direct data transfer between multiple pairs of processors in a multiprocessor system, using for example appropriate multiplexers and logic circuitry.

Implementation

FIG. 1 depicts in block diagram form a prior art communications system 10 for transferring data between processors A & B in a multiprocessor system. The communications system includes a data memory 12 and two processors; processor A 14, and processor B 16. The data memory may actually be a part of a memory coupled to the multiprocessor system (not shown), or it may take the form of shared semaphore registers as described in the background art section. Both processor A and processor B are connected to the data memory and both are able to address it. Data memory 12 typically includes both data storage and a status indicator (bit or bits) which informs a processor attempting to read the data whether the data is in fact ready to be read. This is commonly known as polling.

As an operational example of system 10, consider a typical application where processor A 14 and processor B 16 each have assigned tasks. Assume processor B action is conditioned to rely on data from processor A. When processor A finishes its task on the given data, processor B takes the data and performs a further task on it. However, processor B cannot perform its related task until processor A has placed the necessary data in data memory 12. Thus, processor B polls data memory 12 to ascertain whether processor A has finished with the corresponding preassigned task. Processor A signals that it is finished with its task by setting the data memory status indicator accordingly and transferring the data to data memory.

Processor A 14 sends the data address and status to memory 12 over a memory address bus 18. This bus could be specific to processor A, or it could be shared with other processors in the system. Processor A sends data to and receives data from data memory 12 over a memory data bus 19. Processor B tests the status of the desired information by sending a command over a memory address bus 20 to read the corresponding status location, and then receives the status signal to interpret over a memory data bus 22. When processor A has finally set the status to indicate a read can take place (i.e., processor A has finished its assigned task), processor B sends the data memory read command over memory address bus 20 and obtains the stored task data over memory data bus 22.

Thus, the data memory has acted as a mediary between processor A 14 and processor B 16 with respect to the data transfer. The data transfer is indirect, in that processor A writes the data in data memory and then processor B reads the data from data memory. The typical system 10 described above can be implemented in a number of different ways, but the basic scheme of indirect data transfer using outside data memory is the same. The details of implementation and standard operation of such interprocessor communication systems are well known to those skilled in this art and, accordingly, will not be discussed further herein.

In contrast to the indirect transfer of data in system 10 through external data memory, the present invention provides a novel communication system wherein data is transferred directly from a source processor to a destination processor in a multiprocessor system. Implementation of this novel communication system is described herein below.

The communication system contemplated in this implementation of the present invention contains eight processors. As described below, each processor has a plurality of existing internal general purpose registers, as well as three new, associated multiplexers. In the embodiment discussed below, two of the multiplexers associated with each processor are external and one is internal to the processor. The width of the two external multiplexers depends on the number of processors in the communication system. The width of each processor internal multiplexer depends on the number of corresponding internal registers; in the present implementation, there are eight general purpose registers per processor. The present invention also utilizes existing processor I/O ports.

Since this implementation has 64 internal registers in the system (eight processors each with eight internal registers), a six-bit address field is required, three bits of which are used to represent the register containing the desired data, and three bits are used to represent the processor containing that register. Each register is assigned a unique address which enables access to its contents. Each processor in the communication system is able to generate any of the register addresses. Through a series of multiplexers associated with each processor, and address decode and arbitration logic, the contents of the proper register are selected and transferred to the processor requiring the data.

The present invention can be implemented on any multiprocessor data processing system utilizing, for example, RISC or CISC type processors. Again, the present invention allows for simultaneous, multiple direct data transfer among processors, in contrast to the indirect transfers of the conventional approach described above (see FIG. 1 discussion).

FIG. 2 is a partial block diagram of the key components of the above-summarized direct interprocessor data transfer implementation of the present communication system. Included is a processor A 24 having internal general purpose registers R0 (62) through R7 (64), a GPR MUX 30, and an output port 36. Also included in the system is a processor B 26 with an input port 56, an address bus 60, and an I/O request line 48. The system depicted in FIG. 2 further includes a processor address decode and arbitration logic 46, a GPR Address MUX A 40, and an Input Port MUX B 50. In addition, multiplexer controls 38, 44 and 58 for MUXs 30, 40 and 50, respectively, are included. For purposes of explanation, processor A 24 is arbitrarily the source of the data, and processor B 26 is arbitrarily the destination for the data. GPR MUX 30 has input lines (e.g., 32) from the processor A internal registers so that data from an internal register can be transferred. The output 34 of the GPR MUX is connected to processor A's output port 36 for transfer of data external to processor A. The control 38 to GPR MUX 30 is the output of processor A's GPR Address MUX 40 and specifies which internal register to transfer data from.

GPR Address MUX 40 has the address bus (e.g., 60) of each processor (Proc A Address through Proc H Address) as input lines for selecting therebetween based on control 44. Control 44 to the GPR Address MUX is the output of processor address decode and arbitration logic (herein referred to as ADAR) 46. The ADAR decodes received addresses and arbitrates between concurrently received I/O requests. The input to the ADAR is the address bus (e.g., 60) and I/O request line (e.g., 48) from each processor in the multiprocessor system.

As noted, associated with processor B 26 is a multiplexer, i.e., input port MUX 50. The input port MUX has input lines (GPR MUX A (52) through GPR MUX H) from the output ports (e.g., 36) of each processor in the system and selects therebetween based on multiplexer control 58. Output 54 of input port MUX 50 is connected to input port 56 of processor B. Control 58 to the input port MUX is an output of ADAR 46.

Processor B 26, as the destination processor, generates an address with two identifiers; one for an internal register (e.g., R2 59) containing the data that processor B requires, and one for the processor (e.g., processor A 24) containing the register with the required data. With the six bit address field of the present implementation, the lower three bits are the register identifier, and the upper three bits comprise the source processor identifier. This produces a sequential addressing scheme for the registers; processor A 24 containing registers with addresses '000000' to '000111', processor B containing registers with addresses '001000' to '001111', and so on through processor H containing registers with addresses '111000' to '111111'. The address generated by processor B is part of processor B's normal instruction stream, and rather than being generated in processor B, the address may in some multiprocessor systems be fetched from, for example, external memory. Note that pursuant to this implementation each processor can also access its own internal registers. This is because an application programmer may be unaware of which processor the program is currently operating in at any given stage or operation of the program. Thus, if the program is operating in the processor containing the register with the required data, an error could occur if that processor cannot access its own registers.

An address signal is transferred from processor B 26 on address bus 60 and enters processor address decode and arbitration logic 46. In this implementation, ADAR 46 is hardware which monitors the address bus of each processor for address generation activity. The ADAR discerns based on the chosen addressing scheme, where the address signal is coming from (i.e., which processor is generating the address signal) by monitoring the I/O request lines (e.g., 48), and where it is going to. Only one destination processor at a time can read from a given source processor, but a number of simultaneous reads can take place within the system. More than one read at a time in a given processor is not possible, however, and an arbitration scheme is required. (As an alternative to arbitration, multiple sets of parallel multiplexers could be used to allow simultaneous access of different registers in a single processor.) The ADAR handles the necessary arbitration between concurrently received addresses intended for the same source processor. The arbitration scheme chosen in this implementation is a simple priortization of the processors with processor A having the highest priority and processor H having the lowest priority. One skilled in the art can readily implement such an arbitration scheme. Although careful programming should prevent two processors wanting to access another processor at the same time, it still may happen.

A three bit control 44 to GPR address MUX 40 identifies the destination processor (herein '001' to indicate processor B) and causes the GPR Address MUX to select one of the processor address buses (e.g., address bus 60). The register identifier portion of the address from the selected address bus becomes a control 38 to processor A's GPR MUX 30. This control 30 in turn causes the GPR MUX to select an input line (e.g. line 32) from one of the associated internal registers (e.g., R2 59). The GPRMUX transfers the contents of the selected register to processor A output port 36.

From there, the data is transferred on data bus 52 to processor B input port MUX 50. Data bus 52 is also connected to all input port MUX's (not shown) within the communication system. The input port MUX selects one of the processor data buses based on control 58, the output of processor address decode and arbitration logic 46. Currently, such data buses are typically 16 bits wide. The data is then transferred from the selected processor data bus (here from processor A 24) to the destination processor input port (here input port 56).

The following example explains the data transfer operation pursuant to the present invention in greater detail. Assume processor B 26 requires data contained in register R2 (59) of processor A 24. Processor B generates (or fetches) the address assigned to R2, here '0000000000000010'. A sixteen bit address field is chosen because address buses in current multiprocessor systems are typically this wide. However, since the presently implemented communication system is comprised of eight processors, only six of the bits are needed. The rest of the address field is made zero, although it could conceivably be anything. Note also that the necessary 6 bit address could be placed in higher address space; lower space is chosen for ease of implementation. Here, register R0 (62) is numbered '000' and the other registers are sequentially identified up to register R7 (64) which is numbered '111'. Thus, the three least significant bits, here '010', identify register R2. The next three significant bits identify the source processor, here '000' identifies processor A 24.

Processor B's 26 generated address is sent via address bus 60 to processor address decode and arbitration logic (ADAR) 46. There, the address is broken up to isolate the source processor identifier. The processor identifier indicates to the ADAR which processor's GPR Address MUX to send a control signal to. Here, the '000' source processor identifier indicates processor A 24 has been chosen. Thus, the ADAR sends a three bit control signal 44 (here '001') to processor A's GPR Address MUX 40 indicating to select the processor B address bus 60, as processor B is the destination register generating the address.

The processor A GPR Address MUX 40 transfers only the register identifier portion of the address taken from the processor B address bus 60 to processor A's GPR MUX 30 Here, the register identifier is '010', i.e., the three least significant bits of the address. This becomes the control 38 to processor A's GPR MUX. The control indicates that the GPR MUX should select internal register R2 (59). The contents of R2 are then transferred to processor A's output port 36. Data bus 52 carries the data from the output port to processor B input port MUX 50. Actually, data bus 52 carries the data to each processor's input port MUX (not shown), but only the multiplexer associated with the destination processor, here processor B, is directed by the ADAR to select processor A data bus 52. Processor B Input Port MUX 50 is directed by address decode and arbitration logic 46 via three bit control line 58 to select processor A data bus 52. The data is then sent to processor B's input port 56 via line 54.

The result is a direct transfer of data from processor A 24 to processor B 26. "Direct transfer" in this context means direct in the sense that the means utilized, three multiplexers and address decode and arbitration logic, act as switches that guide the data on a path to the destination processor. At no point is the data latched, for example in memory.

The present invention, as embodied in the implementation described above, improves on the prior art by allowing direct data transfer between processors in a multiprocessor data processing system. Clearly, direct data transfer as described herein requires less cycles than the prior art store-and-read method, and therefore improves system performance. In addition, memory space is freed up to be utilized for other purposes. While the present implementation requires certain additional, inexpensive hardware, there are minimal alterations to the existing architecture and thus it is a cost effective way to improve system performance.

It will be appreciated that, although specific embodiments of the invention have been described herein for purposes of illustration, various modifications may be made without departing from the spirit and scope of the invention. For example, direct communication is possible among any number of processors in a multiprocessor system. However, as the number of processors increases, so does the size of the multiplexers involved. As another example, a different arbitration scheme could be used. In addition, the address decode and arbitration logic could be replaced with a software solution, but at a cost in terms of system performance. As a further example, each processor could have a different number of internal registers. Also, the internal registers could be specialized, rather than general purpose.

Accordingly, the scope of protection of this invention is limited only by the following claims and their equivalents.

We claim:

1. An interprocessor communication system for direct processor to processor data transfer in said communication system, said communication system comprising:
    a first microprocessor having a first instruction program and containing a plurality of internal general purpose registers, each of said internal general purpose registers having its own unique I/O address within the interprocessor communication system preassigned thereto for access of data stored therein independent of said first instruction program;
    a second microprocessor having a second instruction program, said second microprocessor including means for generating an address signal corresponding to one of said first microprocessor's unique internal general purpose register addresses; and
    dedicated data transfer hardware, coupling said first microprocessor and said second microprocessor, and responsive to a second microprocessor generated address signal for transferring data directly from the corresponding one of said first microprocessor's internal general purpose registers to said second microprocessor, said data transfer being transparent to said first microprocessor's first instruction program.

2. The system according to claim 1, wherein said second microprocessor generated address signal includes a register identifier for identifying a particular one of said first microprocessor's internal general purpose registers, and wherein said data transfer hardware includes a register multiplexer, said register multiplexer having contents of each of said first microprocessor's internal general purpose registers as inputs and having said register identifier as a control, wherein said register identifier control causes said register multiplexer to select the contents of the internal general purpose register corresponding to said register identifier for transfer to said second microprocessor.

3. The system according to claim 2, wherein said register multiplexer is internal to said first microprocessor.

4. The system according to claim 1, further comprising address receiving means associated with said first microprocessor for receiving said second microprocessor's generated address signal.

5. The system according to claim 1, further comprising data receiving means associated with said second microprocessor for receiving said first microprocessor's transferred data.

6. An interprocessor communication system for a multiprocessor data processing system for direct processor to processor data transfer in said multiprocessor system, said multiprocessor system including a first microprocessor and a second microprocessor, said first microprocessor having a first instruction program and containing a plurality of internal general purpose registers each having its own unique I/O address within the multiprocessor communication system preassigned thereto for accessing data stored therein independent of said first instruction program, said second microprocessor including means for generating an address signal corresponding to one of said first microprocessor's unique internal general purpose register addresses, said communication system comprising:
    electrical coupling means for coupling said first microprocessor and said second microprocessor; and
    dedicated data transfer hardware responsive to a second microprocessor generated address signal for transferring data directly from the corresponding one of said first microprocessor unique internal general purpose registers to said second microprocessor using said electrical coupling means, said data transfer being transparent to said first microprocessor's first instruction program.

7. The system according to claim 6, wherein said second microprocessor generated address signal includes a register identifier for identifying a particular one of said first microprocessor's internal general purpose registers, and wherein said data transfer hardware includes a register multiplexer, said register multiplexer having contents of each of said first microprocessor's internal general purpose registers as inputs and having said register identifier as a control, wherein said register identifier control causes said register multiplexer to select the contents of the first microprocessor register corresponding to said register identifier for transfer to said second microprocessor.

8. The system according to claim 7, wherein said register multiplexer is internal to said first microprocessor.

9. The system according to claim 6, further comprising address receiving means associated with said first microprocessor for receiving said second microprocessor generated address signal.

10. The system according to claim 6, further comprising data receiving means associated with said second microprocessor for receiving said first microprocessor's transferred data.

11. An interprocessor communication system for a multiprocessor data processing system for direct processor to processor data transfer in said data processing system, said multiprocessor system including N microprocessors, each of said N microprocessors having its own instruction program and including a plurality of internal general purpose registers, said each internal general purpose register in each of said N microprocessors having its own unique I/O addresses within the interprocessor communication system preassigned thereto for accessing data stored therein, and at least one of said N microprocessors being configured to generate an address signal including a source processor identifier identifying a source microprocessor in said multiprocessor system and a register identifier corresponding to one of said unique internal general purpose register addresses in the source microprocessor, said interprocessor communication system comprising:
    address decoding means for receiving and decoding a processor generated address signal and for generating a destination processor identifier signal based thereon, said destination processor identifier signal identifying the microprocessor which generated said address signal;

N address receiving means, each of said address receiving means being associated with one of said N microprocessors for receiving a microprocessor generated address signal and a destination processor identifier signal and responding thereto by transmitting the register identifier portion of said microprocessor generated address signal to its associated microprocessor;

N data transfer means, each of said data transfer means being associated with one of said N microprocessors, each of said data transfer means being coupled to receive the register identifier portion of a transmitted address signal from its corresponding address receiving means and respond thereto independent of the associated microprocessor's instruction program by transferring data contained in the selected one of said plurality of internal general purpose registers to said destination processor; and N data receiving means, each of said data receiving means being associated with one of said N microprocessors, each of said data receiving means being coupled to receive the source processor identifier portion of the decoded address signal and respond thereto by receiving and forwarding data to said associated microprocessor from the data transfer means identified by the received source processor identifier signal.

12. The system according to claim 11, wherein said address decoding means includes arbitration means for arbitrating among substantially concurrently received address signals containing identical source processor identifiers.

13. The system according to claim 11, wherein said N address receiving means each includes an address multiplexer, each of said destination processor identifier signals being a control to a particular one of said address multiplexers, wherein each of said address multiplexer controls causes the associated address multiplexer to select a particular microprocessor generated address signal and transmit said register identifier portion thereof to the data transfer means associated with the corresponding microprocessor.

14. The system according to claim 11, wherein said data transfer means associated with each of said N microprocessors includes a register multiplexer, each register identifier signal transmitted by an address receiving means being a control to the associated register multiplexer, wherein each of said register multiplexer controls causes the associated register multiplexer to select the contents of one of the internal general purpose registers for transfer to one of said N microprocessor associated data receiving means.

15. The system according to claim 11, wherein each of said data transfer means is internal to said associated microprocessor.

16. The system according to claim 11, wherein said N data receiving means each includes a data multiplexer, and wherein each decoded source processor identifier portion of an address signal is a control to a particular one of said data multiplexers, each of said data multiplexer controls causing a particular data multiplexer to select data from one of said N data transfer means.

17. The system according to claim 11, wherein said address decoding means includes circuitry for isolating said source processor identifier portion of an address signal and transmitting each isolated source processor identifier signal to data receiving means associated with the corresponding destination microprocessor.

18. The system according to claim 12, wherein said arbitration means includes an arbitration scheme with predefined solutions to substantially concurrently received address signals with identical source processor identifiers for transmitting one such signal to the address decoding means.

19. The system according to claim 18, wherein said arbitration means includes dedicated logic circuitry for implementing said arbitration scheme.

20. The system according to claim 18, wherein said arbitration means includes a microprocessor for implementing said arbitration scheme.

21. The system according to claim 13, wherein each of said N microprocessor associated address multiplexers includes N selectable inputs thereto.

22. The system according to claim 16, wherein each of said N microprocessor associated data multiplexers includes N selectable inputs thereto.

23. A communication method for a multiprocessor data processing system having a first microprocessor and a second microprocessor, said first microprocessor having an instruction program and containing a plurality of internal general purpose registers each having its own unique I/O address within the multiprocessor data processing system preassigned thereto for accessing data stored therein independent of said instruction program, said communication method comprising the steps of:

(a) generating an address signal using said second microprocessor, said generated address signal corresponding to one of said first microprocessor's unique internal general purpose register addresses;

(b) transferring said second microprocessor generated address signal to said first microprocessor;

(c) using said second microprocessor generated address signal to access data stored in a corresponding one of said first microprocessor internal general purpose registers independent of said first microprocessor's instruction program; and (d) transferring said accessed data stored in said corresponding first microprocessor internal general purpose register from said first microprocessor directly to said second microprocessor, said direct data transferring being transparent to said first microprocessor's instruction program.

24. The method as set forth in claim 23, wherein said accessing step (c) further includes multiplexing said data stored in said plurality of first microprocessor internal general purpose registers, said second microprocessor generated address signal being used as a control to said multiplexing function.

25. The method as set forth in claim 23, wherein said multiprocessor data processing system also includes data transfer means responsive to said second microprocessor generated address signal, and wherein said transferring step (b) includes transferring said second microprocessor generated address signal to said data transfer means, and wherein said accessing step (c) includes using said second microprocessor generated address signal as a control of said data transfer means to access data stored in the corresponding one of said first microprocessor internal general purpose registers.

* * * * *